(12) United States Patent
Tamura et al.

(10) Patent No.: US 6,481,045 B1
(45) Date of Patent: Nov. 19, 2002

(54) CAPSTAN SHAFT CLEANING DEVICE

(75) Inventors: Kazuya Tamura, Isehara (JP); Masahiro Harima, Atsugi (JP); Naoki Tatsumi, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/521,346

(22) Filed: Mar. 9, 2000

(30) Foreign Application Priority Data

Mar. 15, 1999 (JP) .......................................... 11-069058

(51) Int. Cl.[7] .................................................. B08B 1/00
(52) U.S. Cl. ..................... 15/256.51; 226/102; 226/181; 226/190; 242/354
(58) Field of Search .......................... 15/256.5, 256.51; 226/102, 181, 190, 200; 242/354

(56) References Cited

U.S. PATENT DOCUMENTS

| | | | | | |
|---|---|---|---|---|---|
| 1,247,173 A | * | 11/1917 | Suehy, Jr. | ............ | 15/256.51 X |
| 1,451,990 A | * | 4/1923 | La Chapelle | ............ | 15/256.51 |
| 1,454,316 A | * | 5/1923 | Dover | ............ | 15/256.51 |
| 1,742,070 A | * | 12/1929 | Groves | ............ | 15/256.51 X |
| 2,323,907 A | * | 7/1943 | Harriss et al. | ........ | 15/256.51 X |
| 3,642,536 A | * | 2/1972 | Robak | ............ | 15/256.51 X |
| 4,586,212 A | * | 5/1986 | Gasser | ............ | 15/256.51 |
| 5,662,041 A | * | 9/1997 | Kleist | ............ | 101/163 |

FOREIGN PATENT DOCUMENTS

GB 392670 * 5/1933 ............... 15/256.51

* cited by examiner

Primary Examiner—Mark Spisich
(74) Attorney, Agent, or Firm—Ladas & Parry

(57) ABSTRACT

A capstan shaft cleaning device has a cleaning member removing dirt attached to a capstan shaft and a moving mechanism moving the cleaning member between a position at which the cleaning member contacts the capstan shaft and a position at which the cleaning member is separated from the capstan shaft, the cleaning member having at least two points of contact contacting a periphery of the capstan shaft.

2 Claims, 5 Drawing Sheets

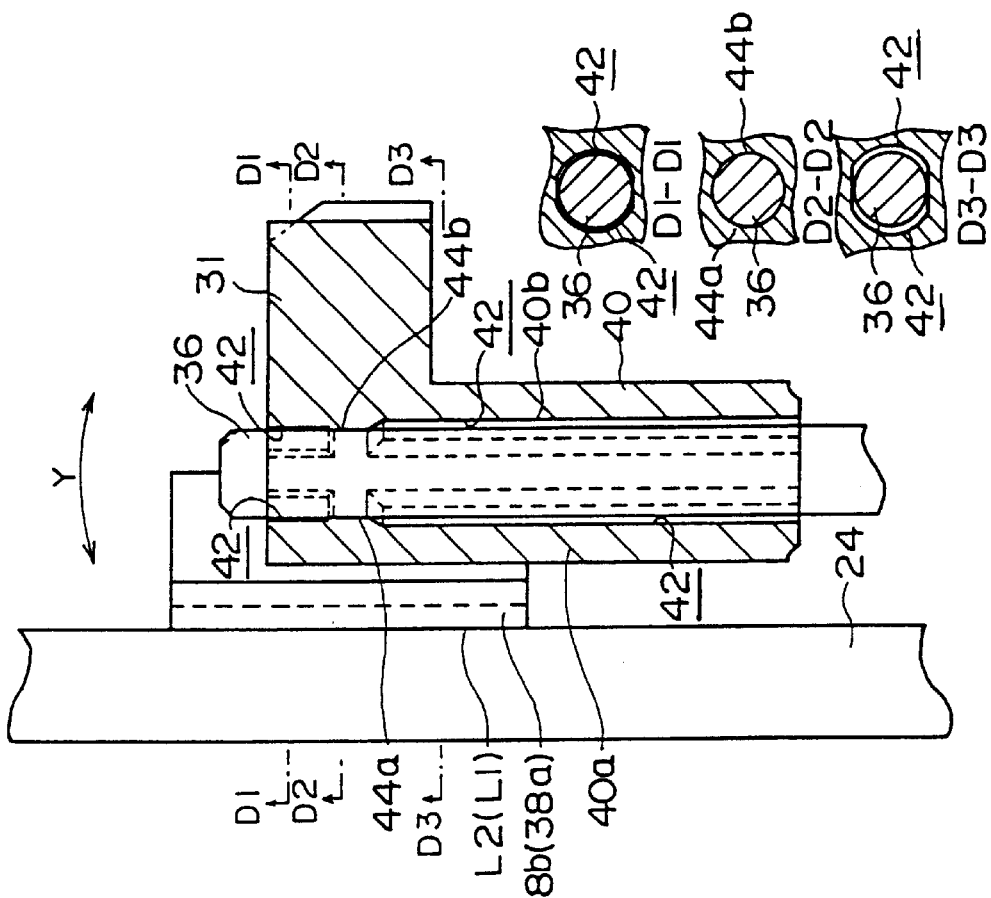
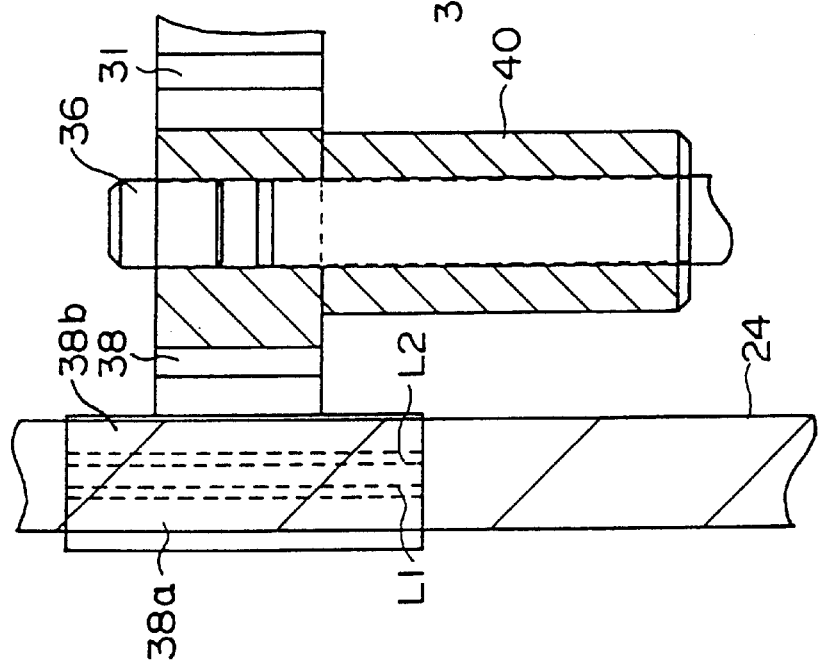

CAPSTAN SHAFT CLEANING DEVICE

BACKGROUND OF THE INVENTION

1. Field of the Invention

The present invention relates generally to a capstan shaft cleaning device.

2. Description of the Related Art

Generally, an apparatus for magnetically recording and reproducing information such as, for example, a digital audio tape recorder, or DAT, is provided with a capstan shaft and pinch roller for making a magnetic recording medium such as a magnetic tape run at a constant speed. The capstan shaft is rotated at a constant rpm by a capstan motor, the pinch roller presses the magnetic tape against the capstan shaft during a tape loading operation and the tape runs at a constant speed corresponding to the rotation of the capstan shaft, making it possible to carry out stable magnetic recording and reproduction of information to and from the magnetic tape.

As described above, the capstan shaft is in sliding contact with the magnetic tape during magnetic recording and reproduction, so magnetic particles can come loose from and fall off the magnetic tape onto the capstan shaft. Once these magnetic particles fall onto the capstan shaft the magnetic tape can no longer run with stability.

As a result, the conventional magnetic recording/reproduction apparatus is provided with a cleaning device to remove magnetic particles and other such dirt and dust from the capstan shaft.

FIG. 1 is a partial cutaway plan view of a conventional capstan shaft cleaning device. As shown in the diagram, the capstan shaft 2 is supported so as to rotate freely within a capstan housing 3.

A felt material 4 that functions as a cleaning device 1 is affixed to the capstan housing 3. The felt material 4 is positioned so as to contact the capstan shaft 2 from a side opposite the side on which the magnetic tape slidingly contacts the capstan shaft 2. Accordingly, the felt material 4 is in continuous contact with the capstan shaft 2, wiping away magnetic particles and other dirt.

However, a problem arises in that although the conventional cleaning device 1 using a felt material 4 performs adequately at first, over time the felt material 4 becomes dirty and its effectiveness as a cleaner diminishes sharply. In the worst case, magnetic particles adhering to the felt material 4 come off onto the capstan shaft 2.

Additionally, because the felt material 4 is affixed to the capstan housing 3 it is not easy to replace the felt material 4 when the felt material 4 becomes dirty. Moreover, because the felt material 4 is used under high-temperature conditions the felt material 4 sometimes peels off from the capstan housing 3.

SUMMARY OF THE INVENTION

Accordingly, it is a general object of the present invention to provide an improved and useful capstan shaft cleaning device in which the disadvantages described above are eliminated.

A further object of the present invention is to provide an improved and useful capstan shaft cleaning device in which the cleaning effectiveness thereof can be maintained for an extended period of time.

The above-described objects of the present invention are achieved by a capstan shaft cleaning device comprising:

a cleaning member removing dirt attached to a capstan shaft; and a moving mechanism moving the cleaning member between a position at which the cleaning member contacts the capstan shaft and a position at which the cleaning member is separated from the capstan shaft, the cleaning member having at least two points of contact contacting a periphery of the capstan shaft.

According to the invention described above, the effectiveness of the capstan shaft cleaning device can be maintained over an extended period of time. In particular, because cleaning member contact points are formed at at least two points along a peripheral direction of the capstan shaft, the capstan shaft cleaning device can still securely slidably contact the capstan shaft and remove magnetic particles and other dirt adhering to the capstan shaft even if the assembled capstan shaft cleaning device and the capstan shaft are out slightly of position with respect to each other.

Additionally, the above-described objects of the present invention are also achieved by the capstan shaft cleaning device as described above, wherein:

the contact points of the cleaning member are made of a hard resin material including an antistatic agent; and the contact points form projections with obtuse angles in cross-section in a direction of a radius of the capstan shaft.

According to the invention described above, there is no diminution in cleaning power as is the case with the conventional felt material and cleaning effectiveness can be maintained over an extended period of time.

Additionally, the above-described objects of the present invention are also achieved by a capstan shaft cleaning device comprising:

a cleaning member removing dirt attached to a capstan shaft; and a moving mechanism moving the cleaning member between a position at which the cleaning member contacts the capstan shaft and a position at which the cleaning member is separated from the capstan shaft, the moving mechanism being provided with a follow mechanism that displaces so that a contact line of the cleaning member contacting the capstan shaft adheres closely to the capstan shaft.

Additionally, the above-described objects of the present invention are also achieved by a capstan shaft cleaning device as described above, wherein the cleaning member comprises:

an arm; and a bearing part, a contact portion having a contact line parallel to an axis of the capstan shaft provided at one end of the arm, the bearing part extending cylindrically from an intermediate position of the arm in a direction parallel to the axis of the capstan shaft, the bearing part supported by a shaft, a gap being provided between the shaft and a portion of the bearing part parallel to a surface including the two contact lines of the cleaning member, a projection being formed at a portion of the bearing part near a side on which the arm is provided, the bearing part being engaged by the shaft via the projection as to be displaceable about the projection, the contact line of the cleaning member following and adhering closely to the capstan shaft.

According to the invention described above, the contact line of the cleaning member changes so as to follow and closely adhere to the capstan shaft and ensure removal of magnetic particles and other dirt adhering to the capstan shaft.

Other objects, features and advantages of the present invention will become more apparent from the following detailed description when read in conjunction with the accompanying drawings.

BRIEF DESCRIPTION OF THE DRAWINGS

FIGS. 5A and 5B are a partial cross-sectional view of the cleaning device shown in FIG. 4 along line A—A and a partial cross-sectional view of the cleaning device shown in FIG. 4 along line B—B, respectively.

DESCRIPTION OF THE PREFERRED EMBODIMENTS

A description will now be given of one preferred embodiment of a magnetic head according to the present invention, with reference to the accompanying drawings.

For clarity of explanation, a brief description will first be given of a magnetic recording/reproduction apparatus such as a DAT streamer, hereinafter referred to simply as an apparatus, adapting the cleaning device 28 of the present invention.

Figure 1:
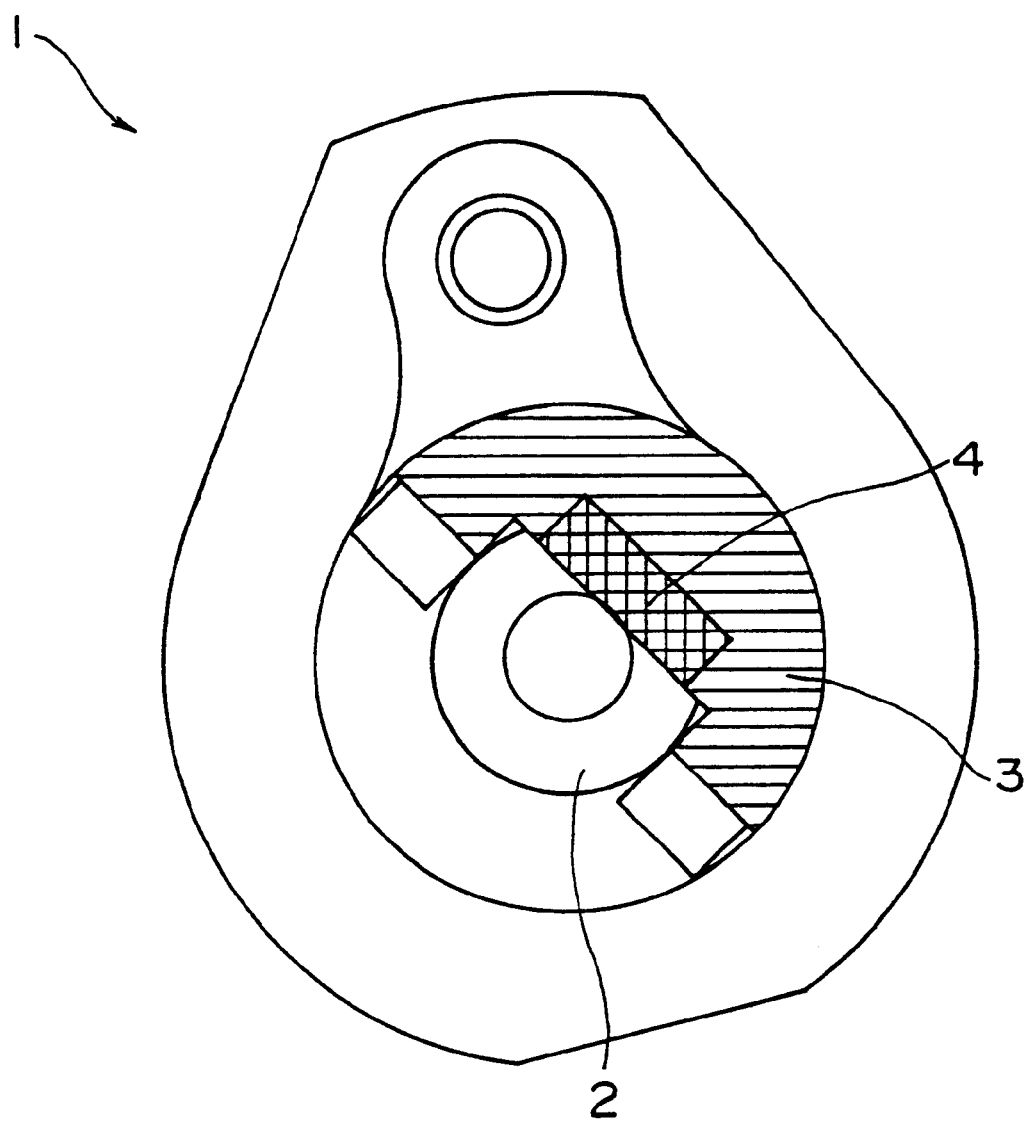
FIG. 1 is a partial cutaway plan view of a conventional capstan shaft cleaning device.
Figure 2:
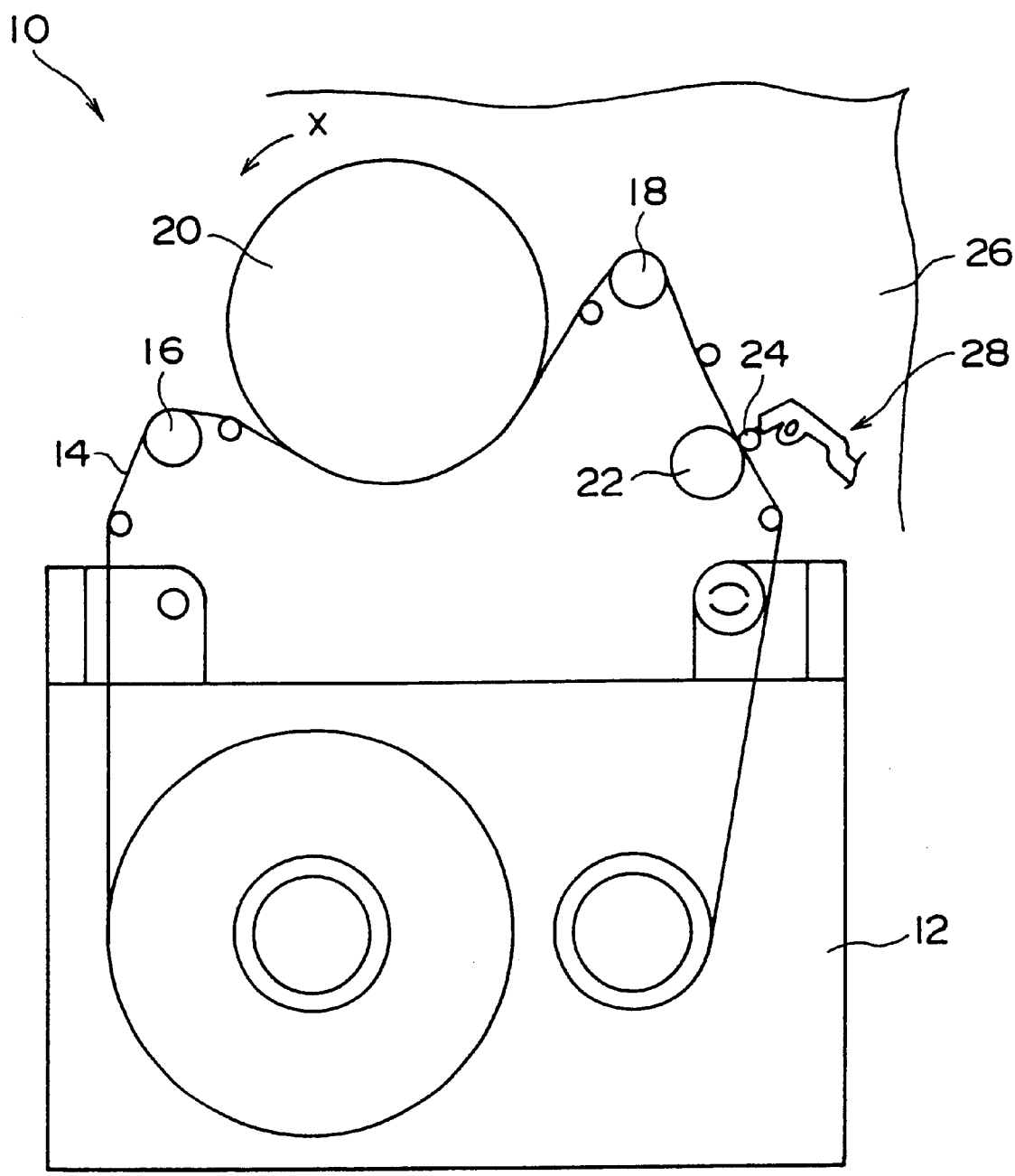
FIG. 2 is a plan view of a magnetic recording/reproduction device adapting a capstan shaft cleaning device according to an embodiment of the present invention.
Figure 3:
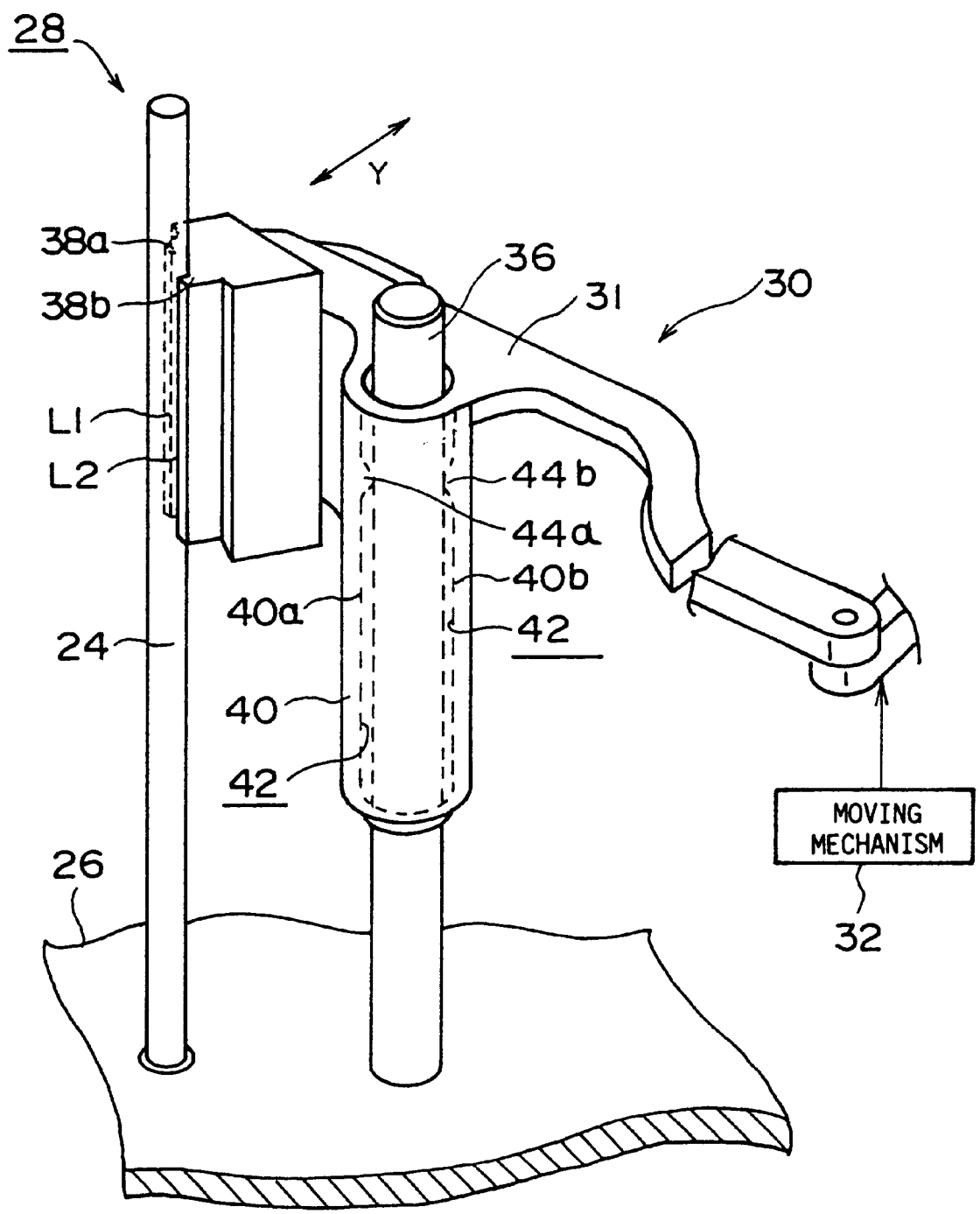
FIG. 3 is an oblique view of a capstan shaft cleaning device according to an embodiment of the present invention.

In the apparatus 10 shown in FIG. 2, magnetic tape 14 is extracted from a loaded DAT tape cassette 12 by loading poles 16, 18 and wound around a rotary drum 20 having a rotary head not shown in the diagram. The magnetic tape 14 is urged onward by a pinch roller 22 and a capstan shaft (capstan) 24, with the rotary drum (rotary head) 20 rotating at high speed in a direction indicated in the diagram by arrow X. Information is recorded to the magnetic tape 14 by the rotary head and information recorded on the magnetic tape 14 is reproduced by the rotary head. The rotary drum 20 is mounted on a drum base fixedly mounted on a chassis not shown in the diagram. Additionally, the pinch roller 22 and capstan shaft 24 is provided on a sub-chassis 26, the sub-chassis 26 being fixedly mounted on the chassis. It should be noted that the capstan shaft cleaning device 28 according to the present invention is mounted on the sub-chassis 26 and disposed opposite the pinch roller 22, with the capstan shaft 24 in between the capstan shaft cleaning device 28 and the pinch roller 22.

Next, a description will be given of the composition of the capstan shaft cleaning device 28.

As shown in FIGS. 3, 4, 5A and 5B, the capstan shaft cleaning device 28 chiefly comprises a cleaning member 30 and a movement member 32 for moving the cleaning ember 30.

The cleaning member 30 comprises an arm 31 and a bearing part 40. Contact points 38a, 38b are formed at one end of the cleaning member 30, the contact points 38a, 38b extending along lines of contact LI, L2 with the capstan shaft 24 parallel to the axis of the capstan shaft 24. The bearing part 40 extends vertically from an intermediate portion of the arm 31, along a line parallel to the axis of the capstan shaft 24. The bearing part 40 is supported by a shaft 36 fixedly mounted on the subchassis 26.

The contact points 38a, 38b are made of a hard resin material including an antistatic agent. As described above there are two such contact points 38a, 38b, so even if there is a slight misalignment between the relative positions of the capstan shaft cleaning device 28 and the capstan shaft 24 the capstan shaft cleaning device 28 can still be in secure sliding contact with the capstan shaft and remove magnetic particles and other dirt adhering to the capstan shaft. Additionally, there is no transfer of static electricity from the cleaning member 30 to the capstan shaft 24, so the magnetic tape 14 can be prevented from winding around the capstan shaft 24.

It should be noted that ceramics and industrial gemstones are also possible materials for the cleaning member 30.

Figure 4:
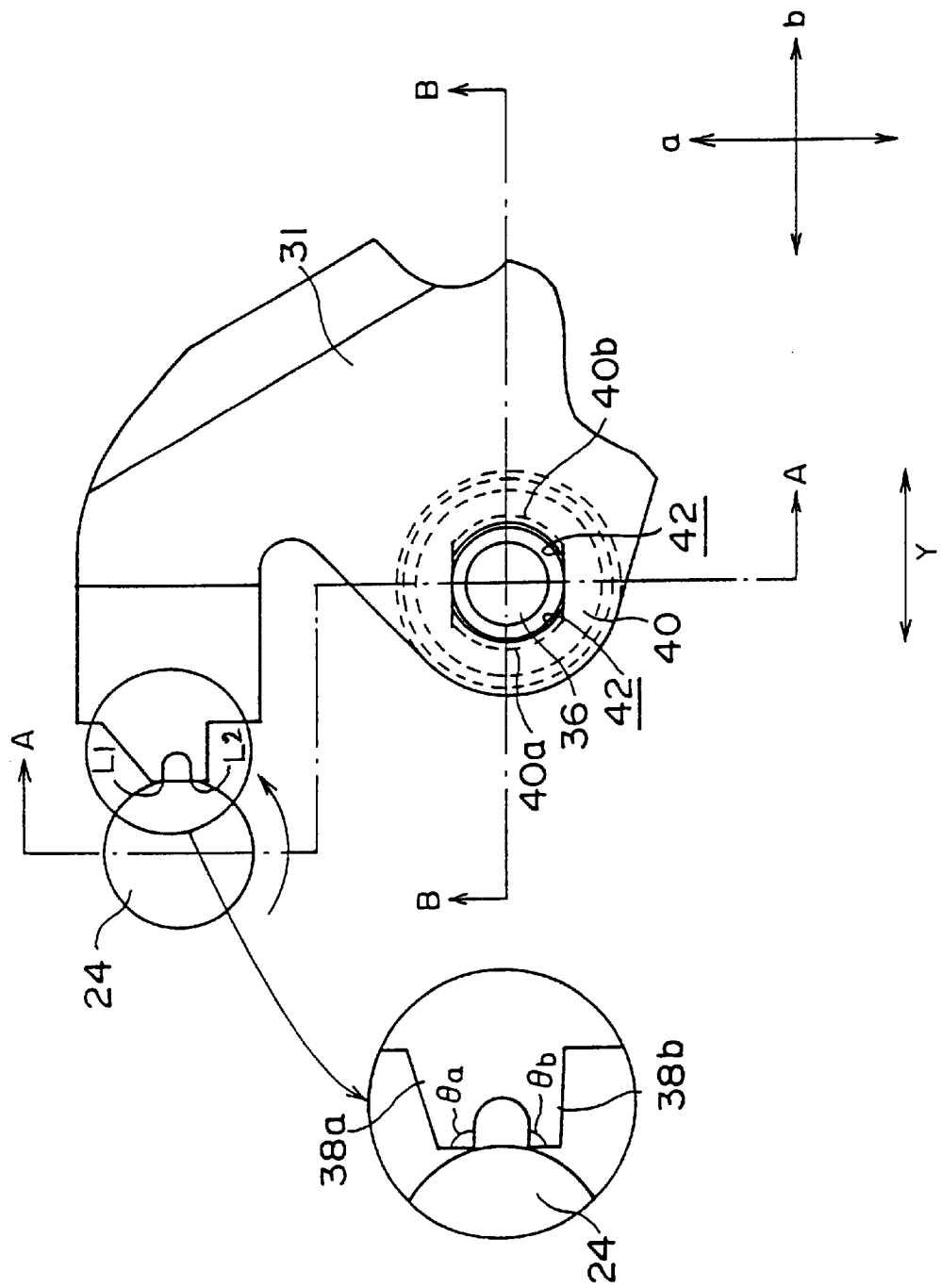
FIG. 4 is a simplified plan oblique view of a capstan shaft cleaning device according to an embodiment of the present invention.

As shown in FIG. 4, the contact points 38a, 38b in cross-section in a direction of a radius of the capstan shaft 24 form projections with obtuse angles θa, θb. It should be noted that the contact points 38a, 38b may in cross-section also form three or more acute angle projections, although two projections are functionally sufficient. Additionally, considering the increased wear on the contact points 38a, 38b in the event that the contact points 38a, 38b in cross-section form acute angles, it is preferable that the contact points 38a, 38b form obtuse angle projections. By so doing the cleaning capacity of the cleaning member 30 is not attrited and magnetic particles adhering to the capstan shaft 24 can be securely removed.

Additionally, a through-hole aperture portion is formed on the bearing part 40 as shown in FIG. 4, in such a way that a radius thereof in a direction of axis b is greater than a radius thereof in a direction of axis a. Accordingly, a gap 42 is formed between portions 40a, 40b of the bearing part 40 parallel to a surface that includes the two lines of contact L1, L2 with the capstan shaft 24 of the contact points 38a, 38b one the one hand and the shaft 36 described above on the other.

Additionally, as shown for example in FIG. 5B, projections 44a, 44b are formed at portions 40a, 40b of the bearing part 40 near a side on which the arm 31 is provided. Portions 40a, 40b of the bearing part 40 at which the projections 44a, 44b are formed correspond to a central position of each of the lines of contact L1, L2 of the cleaning member 30 described above. It should be noted that the gap 42 between the bearing part 40 and the axis 36 is such as to be smaller on a side on which the arm 31 is provided than on a side opposite the side on which the arm 31 is provided, as shown in FIG. 5B. Accordingly, the bearing part 40 is engaged by the shaft 36 via the projections 44a, 44b so as to swingingly displace through an arc of approximately 1° in a direction indicated in FIG. 5B by arrow Y, being self-aligning.

The capstan shaft cleaning device 28 having the structure described above is in a standby mode when the apparatus 10 is not operating or when the magnetic tape 14 is urged forward by the pinch roller 22 and the capstan 24. That is, the capstan shaft cleaning-device 28 is in a state in which the capstan shaft cleaning device 28 is separated from the capstan shaft 24. In the time it takes for the capstan shaft 24 to stop rotating after the pinch roller 22 separates from the capstan shaft 24 when the apparatus 10 stops, the contact points 38a, 38b of the capstan shaft cleaning device 28 are urged by the moving mechanism 32 comprising a crank mechanism or the like into contact with the capstan shaft 24 from a side of the capstan shaft 24 opposite the side of the capstan shaft 24 pressed by the pinch roller 22, thus wiping the capstan shaft 24 free of magnetic particles and other dirt adhering to the capstan shaft 24 and thereby cleaning the capstan shaft 24.

Accordingly, the contact points 38a, 38b are in contact with the capstan shaft 24 not continuously but for a predetermined time period only, so the contact points 38a, 38b are not subjected to unnecessary wear. Additionally, the capstan shaft cleaning device 28 can still securely slidably contact the capstan shaft 24 and remove magnetic particles and other dirt adhering to the capstan shaft 24 even if the assembled capstan shaft cleaning device 28 and the capstan shaft 24 are out of position with respect to each other, because cleaning member contact points are formed at at least two points along a peripheral direction of the capstan shaft and thus the contact lines L1, L2 formed by the contact points 38a, 38b of the cleaning member 30 displace as the bearing part of the capstan shaft cleaning device 28 displaces, thus following and closely contacting the capstan shaft 24 so as to securely slide along the capstan shaft 24 and wiping the capstan shaft 24 free of magnetic particles and the like adhering to the capstan shaft 24.

It should be noted that that although the embodiment described above uses a DAT streamer as the device in which the capstan shaft cleaning device of the present invention is adapted, the cleaning device of the present invention can be adapted for use with a wide variety of magnetic recording/reproduction apparatuses having a capstan shaft.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the present invention.

The present application is based on Japanese Priority Application No. 11-069058, filed on Mar. 15, 1999, the entire contents of which are hereby incorporated by reference.

What is claimed is:

1. A capstan shaft cleaning device comprising:
   a cleaning member removing dirt attached to a capstan shaft; and
   a moving mechanism moving the cleaning member between a position at which the cleaning member contacts the capstan shaft and a position at which the cleaning member is separated from the capstan shaft,
   the cleaning member having at least two points of contact contacting a periphery of the capstan shaft,
   wherein the contact points of the cleaning member are made of a hard resin material including an antistatic agent and the contact points form projections with obtuse angles in cross-section in the direction of a radius of the capstan shaft.

2. A capstan shaft cleaning device comprising:
   a cleaning member removing dirt attached to a capstan shaft;
   a moving mechanism moving the cleaning member between a position at which the cleaning member contacts the capstan shaft and a position at which the cleaning member is separated from the capstan shaft,
   the moving mechanism being provided with a follow mechanism that displaces so that a contact line of the cleaning member contacting the capstan shaft adheres closely to the capstan shaft;
   wherein the cleaning member comprises
      an arm; and
      a bearing part,
   a contact portion having two contact lines parallel to an axis of the capstan shaft provided at one end of the arm, the bearing part extending cylindrically from an intermediate position of the arm in a direction parallel to the axis of the capstan shaft, the bearing part supported by a shaft, a gap being provided between the shaft and a portion of the bearing part parallel to a surface including the two contact lines of the cleaning member, a projection being formed at a portion of the bearing part near a side on which the arm is provided, the bearing part being engaged by the shaft via the projection so as to be displaceable about the projection, the contact lines of the cleaning member following and adhering closely to the capstan shaft.

* * * * *